US010739840B2

(12) United States Patent
Vui (10) Patent No.: US 10,739,840 B2
(45) Date of Patent: Aug. 11, 2020

(54) SYSTEM AND METHOD OF UTILIZING OPERATING CONTEXT INFORMATION

(71) Applicant: Dell Products L.P., Round Rock, TX (US)

(72) Inventor: Kan Lip Vui, Singapore (SG)

(73) Assignee: Dell Products L.P., Round Rock, TX (US)

( * ) Notice: Subject to any disclaimer, the term of this patent is extended or adjusted under 35 U.S.C. 154(b) by 194 days.

(21) Appl. No.: 15/664,649

(22) Filed: Jul. 31, 2017

(65) Prior Publication Data

US 2019/0033951 A1 Jan. 31, 2019

(51) Int. Cl.
| | | |
|---|---|---|
| *G06F 1/00* | (2006.01) | |
| *G06F 1/3287* | (2019.01) | |
| *G06F 11/14* | (2006.01) | |
| *G06F 1/3234* | (2019.01) | |
| *G06F 1/3225* | (2019.01) | |
| *G06F 1/26* | (2006.01) | |

(52) U.S. Cl.
CPC .............. *G06F 1/3287* (2013.01); *G06F 1/26* (2013.01); *G06F 1/3225* (2013.01); *G06F 1/3275* (2013.01); *G06F 11/1456* (2013.01); *G06F 2201/805* (2013.01)

(58) Field of Classification Search
CPC ..................................................... G06F 1/3287
See application file for complete search history.

(56) References Cited

U.S. PATENT DOCUMENTS

| | | | | |
|---|---|---|---|---|
| 5,333,152 A | * | 7/1994 | Wilber ................ | G06F 21/313 379/102.04 |
| 2010/0199021 A1 | * | 8/2010 | Harper ................ | G06F 11/1441 711/103 |
| 2011/0099325 A1 | * | 4/2011 | Roh ...................... | G06F 3/0619 711/103 |
| 2014/0136872 A1 | * | 5/2014 | Cooper ................ | G06F 1/3221 713/324 |
| 2014/0226400 A1 | * | 8/2014 | Kimura ................ | G06F 1/3225 365/185.08 |

(Continued)

OTHER PUBLICATIONS

NVM Express, Inc., "NVM Express," Revision 1.2, Nov. 3, 2014; 205 pages.

(Continued)

*Primary Examiner* — Mohammed H Rehman
(74) *Attorney, Agent, or Firm* — Baker Botts L.L.P.

(57) ABSTRACT

In one or more embodiments, one or more systems, methods, and/or processes may provide information to a non-volatile storage device that indicates a pending power down of the non-volatile storage device without a power down of an information handling system; receive operating context information from the non-volatile storage device; and store the operating context information via a second memory medium. In one or more embodiments, the non-volatile storage device may be or include a solid state drive (SSD), and the operating context information may be or include a flash translation layer table of the SSD. In one or more embodiments, the non-volatile storage device may be powered down, and the one or more systems, methods, and/or processes may provide the operating context information to the non-volatile storage device after the non-volatile storage device is powered up.

17 Claims, 5 Drawing Sheets

(56) References Cited

U.S. PATENT DOCUMENTS

| | | | |
|---|---|---|---|
| 2015/0046636 A1* | 2/2015 | Seo | G06F 12/0246 |
| | | | 711/103 |
| 2016/0283145 A1* | 9/2016 | Han | G11O 5/141 |
| 2017/0010810 A1* | 1/2017 | Huang | G06F 12/0246 |
| 2017/0052734 A1* | 2/2017 | Kirchner | G11C 16/3445 |
| 2017/0228012 A1* | 8/2017 | Shirota | G06F 1/08 |
| 2017/0235495 A1* | 8/2017 | Lin | G06F 3/0607 |
| | | | 711/103 |
| 2018/0039415 A1* | 2/2018 | Peng | G06F 3/0604 |
| 2018/0101477 A1* | 4/2018 | Kan | G06F 12/0246 |

OTHER PUBLICATIONS

Intel Corporation, "Serial ATA Device Sleep (DevSleep) and Runtime D3 (RTD3)." Serial ATA, www.serialata.org, Dec. 2011; 11 pages.

American National Standards Institute, Inc.,"Information Technology—ATA/ATAPI Command Set-3 (ACS-3)." Revision 5, Oct. 28, 2013; 577 pages.

Hewlett-Packard Corporation, et al. "Advanced Configuration and Power Interface Specification." Revision 5.0 Errata A, Nov. 13, 2013; 956 pages.

\* cited by examiner

SYSTEM AND METHOD OF UTILIZING OPERATING CONTEXT INFORMATION

BACKGROUND

Field of the Disclosure

This disclosure relates generally to information handling systems and more particularly to power management of one or more devices of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Moreover, one or more devices of an information handling system may be powered down to conserve power.

SUMMARY

In one or more embodiments, one or more systems, methods, and/or processes may provide information to a non-volatile storage device that indicates a pending power down of the non-volatile storage device without a power down of an information handling system, may receive operating context information from the non-volatile storage device, and may store the operating context information via a memory medium. For example, the memory medium may include a host memory buffer of the information handling system. For instance, the operating context information may be stored via the host memory buffer. In one or more embodiments, the non-volatile storage device may be or include a solid state drive (SSD). For example, the operating context information may include a flash translation layer (FTL) table. In one or more embodiments, the one or more systems, methods, and/or processes may further provide the operating context information to the non-volatile storage device after storing the operating context information via the memory medium. For example, the operating context information may be provided to the non-volatile storage device after the non-volatile storage device is powered up.

In one or more embodiments, a non-volatile storage device may receive information from an information handling system that indicates a pending power down of the non-volatile storage device without a power down of the information handling system, may provide operating context information of the non-volatile storage device to the information handling system, may set a flag that indicates that the information handling system stores the operating context information of the non-volatile storage device, and may power down. For example, the non-volatile storage device may be or include a SSD, and the operating context information may include a FTL table. In one or more embodiments, the non-volatile storage device may store information indicating that the operating context information was provided to the information handling system. For example, the non-volatile storage device may store information indicating that the operating context information was provided to the information handling system via a non-volatile memory medium of the non-volatile storage device. In one or more embodiments, storing information indicating that the operating context information was provided to the information handling system may include utilizing a flag. For example, the flag may indicate whether or not the information handling system stores the operating context information. In one or more embodiments, the non-volatile storage device may transition to a powered off state. After an amount of time, the non-volatile storage device may transition to a powered on state. In one or more embodiments, the non-volatile storage device may determine that the information handling system stores the operating context information and may receive the operating context information from the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a non-volatile memory medium may be powered down (e.g., powered off). For example, the non-volatile memory medium may be powered down to conserve power. For instance, the non-volatile memory medium may be put into a runtime D3 (RTD3) state. In one or more embodiments, an information handling system (IHS) may determine that the non-volatile memory medium may not be utilized for a period of time. For example, to conserve power, the IHS may put the non-volatile memory medium into RTD3. In one instance, the IHS may be or include a portable computing device (e.g., a laptop, an ultrabook, a tablet computing device, etc.), and to conserve power (e.g., battery power), the IHS may put the non-volatile memory medium to RTD3. In another instance, the IHS may be or include a server (e.g., a server computing system), and to conserve power, the IHS may put the non-volatile memory medium to RTD3.

In one or more embodiments, the non-volatile memory medium may store operating context information (e.g., operating context metadata) of the non-volatile memory medium. For example, the non-volatile memory medium may be or include a solid state drive (SSD), and the operating context information may include a flash translation layer (FTL) table. For instance, the FTL table may include translation information that may map logical addresses to physical address associated with the SSD. In one or more embodiments, the FTL table may be stored prior to transitioning to a powered down state. For example, the FTL table may be stored prior to transitioning to a RTD3 state. In one or more embodiments, the non-volatile memory medium may store operating context information via a host memory buffer (HMB). For example, a SSD may store a FTL table via the HMB. In one or more embodiments, an IHS may include a HMB. For example, a memory medium of the IHS may be or include the HMB. For instance, a volatile medium of the IHS may be or include the HMB.

In one or more embodiments, the IHS may provide a notification to the non-volatile memory medium that the IHS is scheduled to provide a command that puts the non-volatile memory medium into a powered down state. For example, the IHS may provide a notification to the non-volatile memory medium that the IHS is scheduled to provide a command that puts the non-volatile memory medium into RTD3. In one or more embodiments, the non-volatile memory medium may provide operating context information to the IHS in response to receiving the notification from the IHS that the IHS is scheduled to provide a command that puts the non-volatile memory medium into a powered down state.

In one or more embodiments, providing the operating context information, utilized by the non-volatile memory medium, to the IHS may reduce an amount of time that the non-volatile memory medium may utilize to transition to a powered down state. For example, providing the operating context information to the IHS may eliminate the non-volatile memory medium storing the operating context in a non-volatile memory of the non-volatile memory medium. For instance, providing the operating context information to the IHS may eliminate the non-volatile memory medium storing the operating context in flash memory. In one or more embodiments, the IHS may be utilized as quick storage for the non-volatile memory medium. For example, the non-volatile memory medium may utilize the IHS to store and retrieve the operating context information of the non-volatile memory medium. In one or more embodiments, the operating context information receiving the operating context information, utilized by the operating context information, from the IHS may reduce an amount of time that the non-volatile memory medium may utilize to transition from a powered down state to an operational state. For example, receiving the operating context information from the IHS may eliminate retrieving the operating context from flash memory. In one or more embodiments, the operating context information utilizing the IHS to store and to retrieve the operating context information may reduce a latency when transitioning the non-volatile memory medium into and/or from a powered down state. For example, reducing a latency when transitioning the non-volatile memory medium into and from a powered down state may improve power savings and/or power conservation without or without significantly impacting performance of the IHS.

Figure 1:
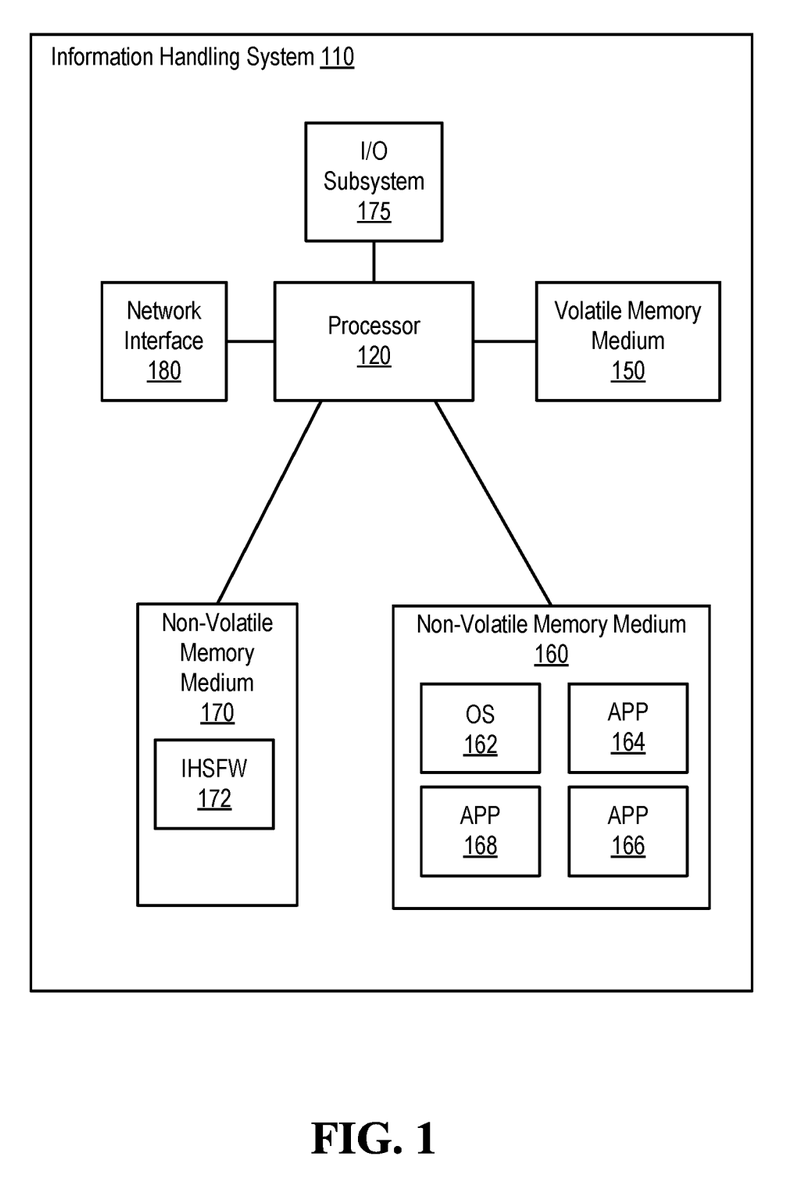
FIG. 1 illustrates an example of an information handling system, according to one or more embodiments.

Turning now to FIG. 1, an example of an information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
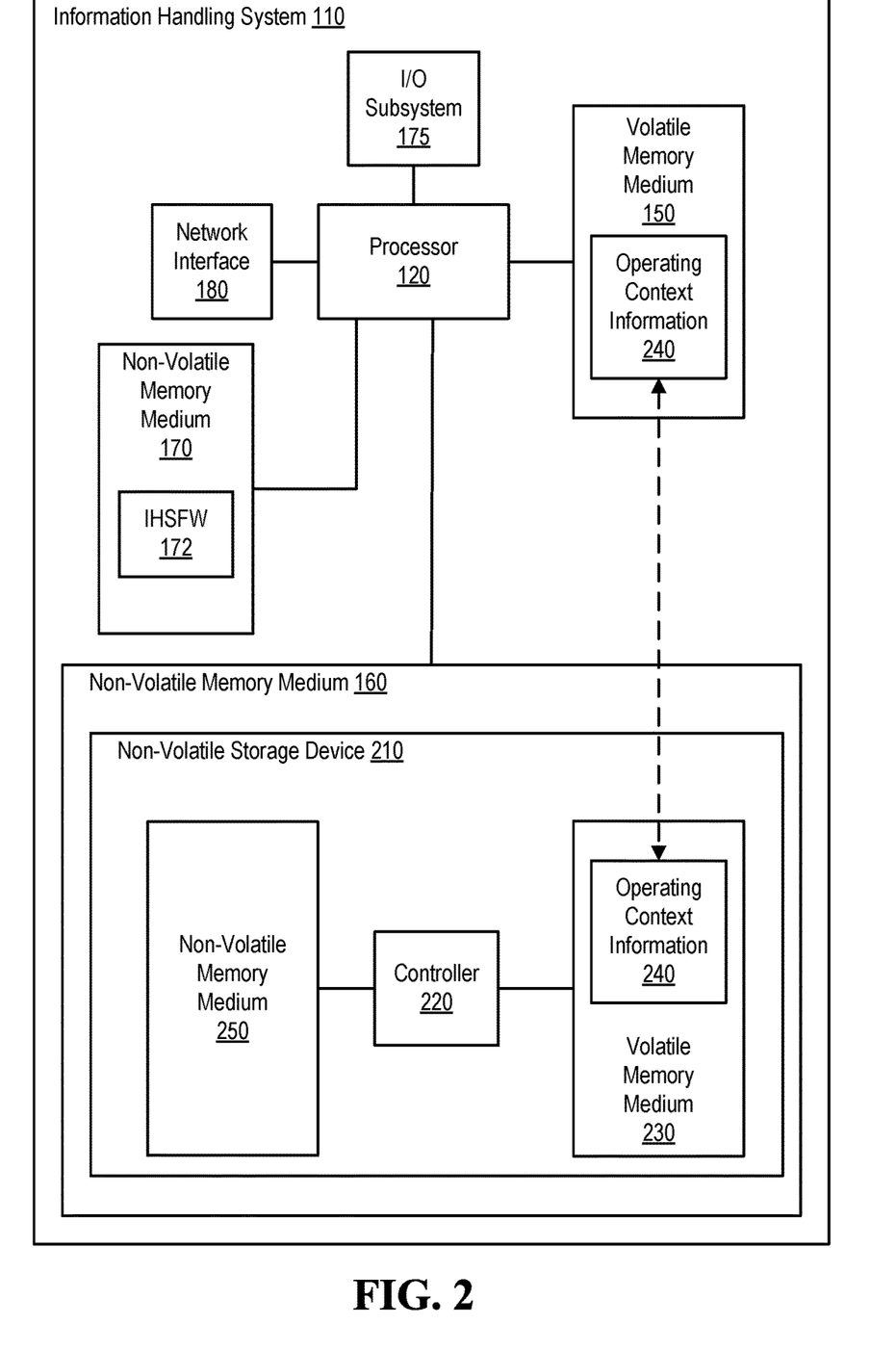
FIG. 2 illustrates another example of an information handling system, according to one or more embodiments.

Turning now to FIG. 2, a further example of an information handling system is illustrated, according to one or more embodiments. As shown, non-volatile memory medium 160 may include a non-volatile storage device 210. In one or more embodiments, non-volatile memory medium 160 may be non-volatile storage device 210. As illustrated, non-volatile storage device 210 may include a controller 220. In one or more embodiments, controller 220 may control operations of non-volatile storage device 210. As shown, non-volatile storage device 210 may include a volatile memory medium 230 and a non-volatile memory medium 250 coupled to controller 220. In one example, volatile memory medium 230 may include one or more structures and/or one or more functionalities of a volatile memory medium described herein. In another example, non-volatile memory medium 250 may include one or more structures and/or one or more functionalities of a non-volatile memory medium described herein.

In one or more embodiments, controller may retrieve and/or store information via volatile memory medium 230 and non-volatile memory medium 250. As illustrated, volatile memory medium 230 may include operating context information 240. In one or more embodiments, controller 220 may utilize operating context information 240 in one or more operations of non-volatile storage device 210. As shown, operating context information 240 may be transferred from volatile memory medium 230 to volatile memory medium 150, and operating context information 240 may be transferred from volatile memory medium 150 to volatile memory medium 230. In one or more embodiments, non-volatile storage device 210 may be or include a SSD. For example, operating context information 240 may be or include a FTL table.

Figure 3:
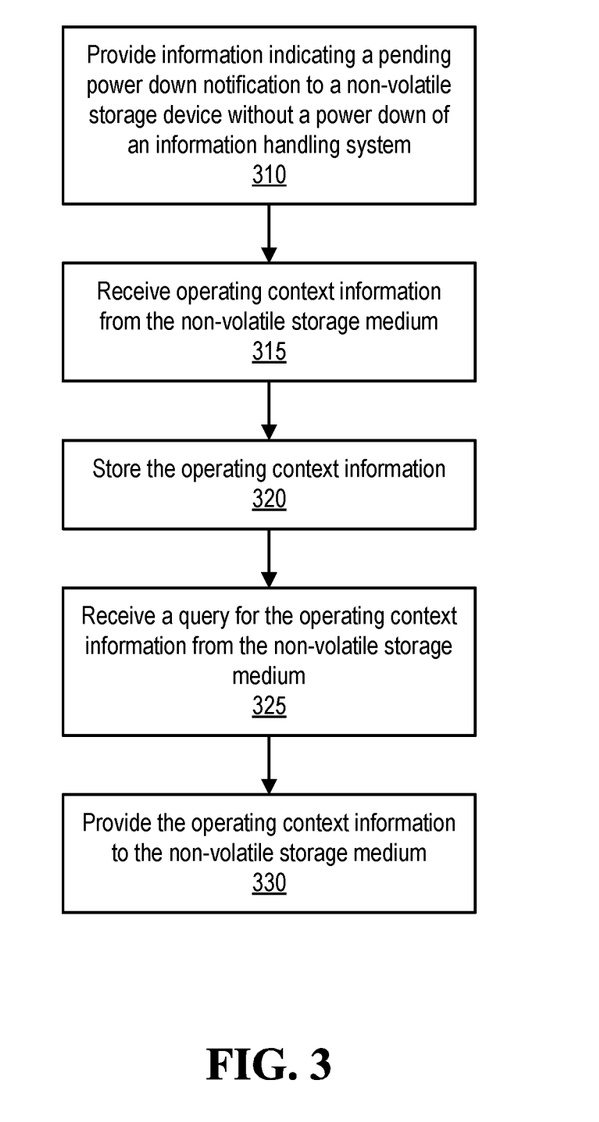
FIG. 3 illustrates an example of a method of operating an information handling system, according to one or more embodiments.

Turning now to FIG. 3, an example of a method of operating an information handling system is illustrated, according to one or more embodiments. At 310, information indicating a power down notification without a power down of an information handling system may be provided to a non-volatile storage device. For example, IHS 110 may provide information indicating a power down notification without a power down of IHS 110 to non-volatile storage device 210. For instance, the information indicating the power down notification may include information indicating that non-volatile storage device 210 will be placed into RTD3.

At 315, operating context information may be received from the non-volatile storage device. For example, IHS 110 may receive operating context information 240 from non-volatile storage device 210. For instance, operating context information 240 may include a FTL table. In one or more embodiments, the non-volatile storage device may be or include a SSD, and IHS 110 may receive a FTL table of the SSD. At 320, the operating context information may be stored. For example, IHS 110 may store operating context information 240 via volatile memory medium 150. In one or more embodiments, IHS 110 may store operating context information 240 for a period of time. For example, IHS 110 may store operating context information 240 while non-volatile storage device 210 is in RTD3.

In one or more embodiments, IHS 110 may store the operating context information via a memory medium that may quickly store and/or retrieve information according to some metric. In one example, a memory medium that may quickly store and/or retrieve information according to some metric may be or include SRAM. In a second example, a memory medium that may quickly store and/or retrieve information according to some metric may be or include DRAM. In another example, a memory medium that may quickly store and/or retrieve information according to some metric may be or include cache storage of a processor.

In one or more embodiments, IHS 110 may store operating context information via a HMB. For example, the HMB may be or include an allocated portion of a memory medium of IHS 110. For instance, the HMB may be exclusively utilized by non-volatile storage device 210 and/or a controller associated with non-volatile storage device 160. In one or more embodiments, the controller associated with non-volatile storage device 210 may be a PCIe function. For example, the PCIe function may implement a non-volatile memory (NVM) Express. For instance the NVM Express may include a register interface and/or a command set for PCIe attached storage. In one or more embodiments, the HMB may not be released and/or reclaimed after non-volatile storage device 210 transitioned to a powered down state (e.g., a powered off state). For example, the HMB may not be released and/or reclaimed after non-volatile storage device 210 is transitioned to RTD3 (e.g., powered off). For instance, the HMB may not be released and/or reclaimed until the operating context information is provided to non-volatile storage device 210.

At 325, a query for the operating context information may be received. For example, IHS 110 may receive a query for operating context information 240 from non-volatile storage device 210. For instance, the query may include a request for a FTL table that was previously provided to IHS 110. At 330, the operating context information may be provided to the non-volatile storage device. For example, IHS 110 may provide operating context information 240 to non-volatile storage device 210. In one or more embodiments, providing the operating context information to the non-volatile storage device may include transferring the operating context information from the memory medium that store the operating context information to the non-volatile storage device. For example, IHS 110 may transfer operating context information 240 from volatile memory medium 150 to non-volatile storage device 210. For instance, volatile memory medium 150 may include a HMB that stores operating context information 240, and transferring operating context information 240 from volatile memory medium 150 to non-volatile storage device 210 may include IHS 110 transferring operating context information 240 from the HMB that stores context information 240 to non-volatile storage device 210.

Figure 4:
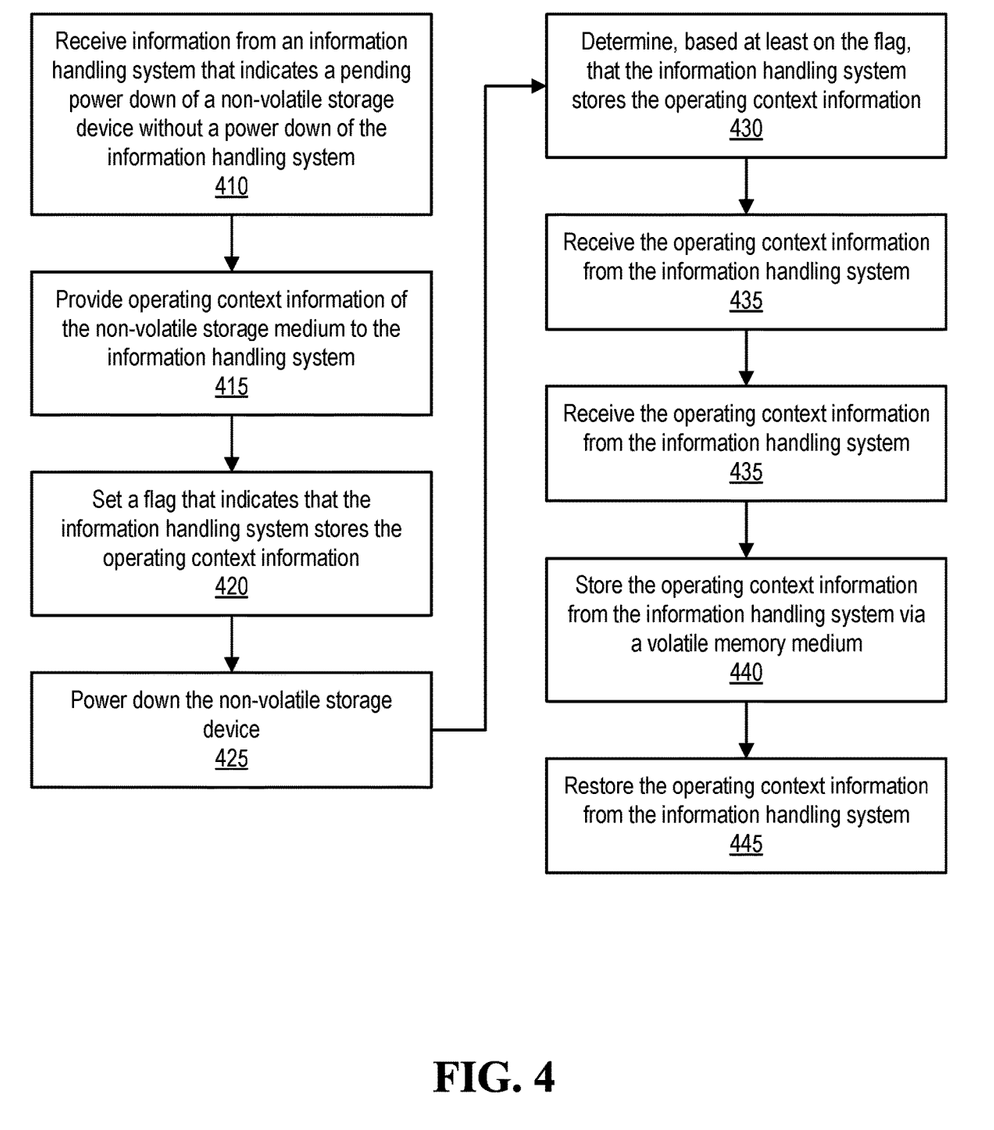
FIG. 4 illustrates an example of a method of operating a non-volatile storage device, according to one or more embodiments.

Turning now to FIG. 4, an example of a method of operating a non-volatile storage device is illustrated, according to one or more embodiments. At 410, information, from an information handling system, that indicates a pending power down of a non-volatile storage device without a power down of the information handling system may be received. For example, non-volatile storage device 210 may receive information, from IHS 110, that indicates a pending power down of non-volatile storage device 210 without a power down of IHS 110. For instance, the information, from IHS 110, that indicates the pending power down of non-volatile storage device 210 without a power down of IHS 110 may include information that non-volatile storage device 210 will be placed into RTD3.

At 415, operating context information of the non-volatile storage device may be provided to the information handling system. For example, non-volatile storage device 210 may provide operating context information 240 to IHS 110. For instance, operating context information 240 may be provided to IHS 110 in response to receiving the information, from IHS 110, that indicates the pending power down of non-volatile storage device 210 without the power down of IHS 110. In one or more embodiments, operating context information 240 may include a FTL table, and non-volatile storage device 210 may provide the FTL table to IHS 110.

At 420, a flag, that indicates that the information handling system stores the operating context information of the non-volatile storage device, may be set. For example, non-volatile storage device 210 may set a flag that indicates that IHS 110 stores operating context information 240. For instance, non-volatile storage device 210 may set the flag that indicates that IHS 110 stores operating context information 240 via non-volatile memory medium 250. In one or more embodiments, non-volatile memory medium 250 may store the flag indicates if IHS 110 stores operating context information 240.

At 425, the non-volatile storage device may be powered down. For example, non-volatile storage device 210 may be powered down. For instance, powering down non-volatile storage device 210 may include placing non-volatile storage device 210 into RTD3. In one or more embodiments, non-volatile storage device 210 may receive a power down command from IHS 110. For instance, the power down command may indicate that non-volatile storage device 210 is to transition to RTD3.

At 430, it may be determined, based at least on the flag, that the information handling system stores the operating context information. For example, non-volatile storage device 210 may determine that IHS 110 stores operating context information 240. For instance, non-volatile storage device 210 may determine that IHS 110 stores operating context information 240 via receiving information from non-volatile memory medium 250 that store the flag that indicates if IHS 110 stores operating context information 240.

At 435, the operating context information may be received from the information handling system. For example, non-volatile storage device 210 may receive operating context information 240 from IHS 110. At 440, the operating context information may be stored via a volatile memory medium. For example, non-volatile storage device 210 may store operating context information 240 from IHS 110 via volatile memory medium 230. At 445, the operating context information may be restored. For example, non-volatile storage device 210 may restore operating context information 240. For instance, restoring operating context information 240 may include configuring non-volatile storage device 210 to utilize operating context information 240 received from IHS 110.

Figure 5:
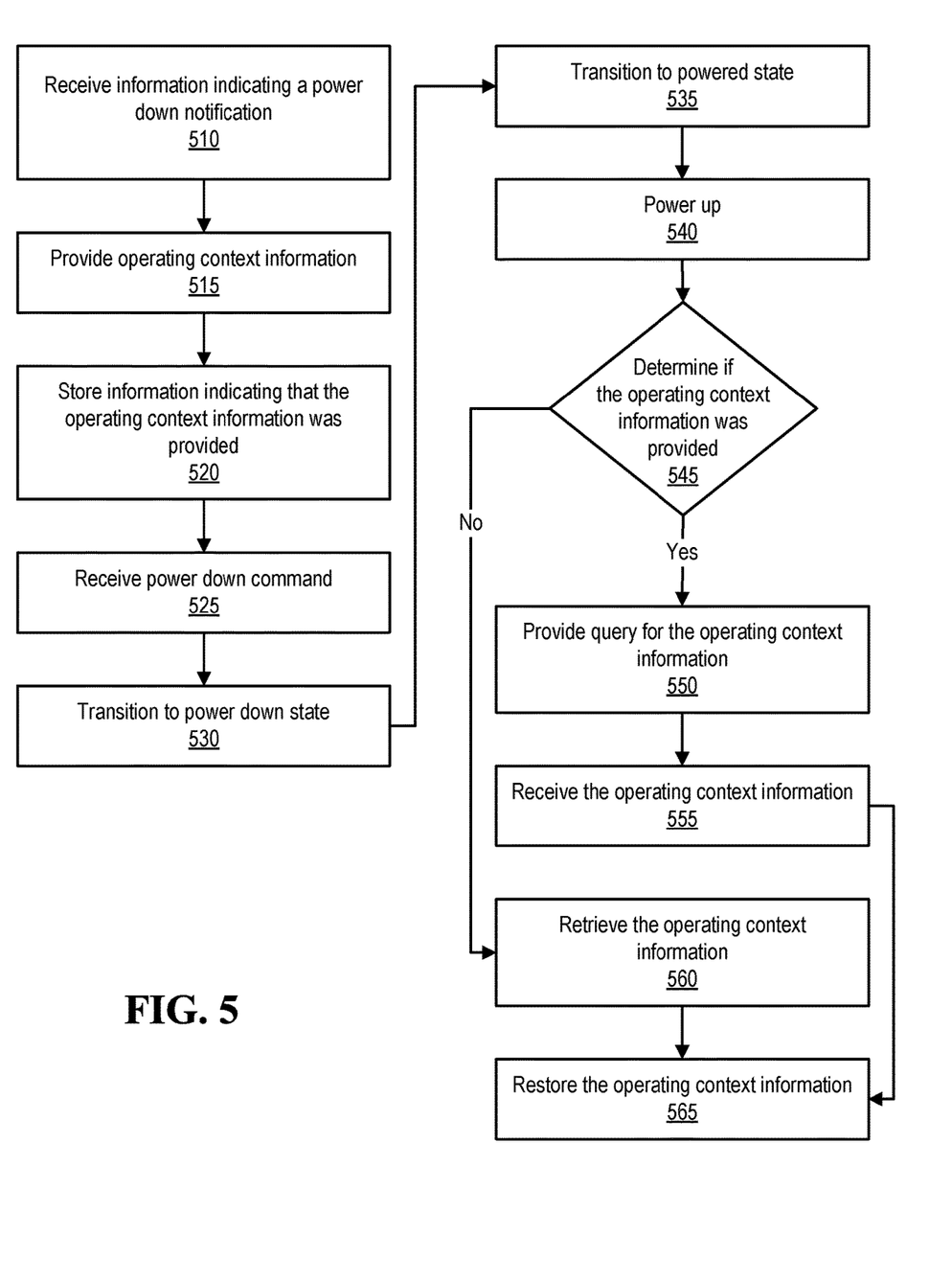
FIG. 5 illustrates another example of a method of operating a non-volatile storage device is illustrated, according to one or more embodiments.

Turning now to FIG. 5, another example of a method of operating a non-volatile storage device is illustrated, according to one or more embodiments. At 510, information indicating a pending power down notification may be received. For example, non-volatile storage device 210 may receive information indicating a pending power down notification from IHS 110. For instance, information indicating a pending power down notification from IHS 110 may indicate that non-volatile storage device 210 will be placed into RTD3.

At 515, operating context information may be provided. For example, non-volatile storage device 210 may provide operating context information 240 to IHS 110. For instance, operating context information 240 may include a FTL table, and non-volatile storage device 210 may provide the FTL table to IHS 110. At 520, information indicating that the operating context information was provided may be stored. For example, non-volatile storage device 210 may store information indicating that the operating context information was provided to IHS 110. For instance, non-volatile storage device 210 may store the information indicating that the operating context information was provided to IHS 110 via a non-volatile memory medium. In one or more embodiments, storing the information indicating that the operating context information was provided to IHS 110 may include storing and/or toggling a flag. For example, the flag may indicate whether the operating context information was provided to IHS 110.

At 525, a power down command may be received. For example, non-volatile storage device 210 may receive a power down command from IHS 110. For instance, the power down command may indicate that non-volatile storage device 210 is to transition to RTD3. At 530, a transition to a power down state may be performed. For example, non-volatile storage device 210 may transition to a power down state. For instance, non-volatile storage device 160 may transition to RTD3. At 540, a power up may be performed. For example, non-volatile storage device 210 may power up. For instance, non-volatile storage device 210 may power up after being powered down (e.g., put into RTD3, powered off, etc.).

At 545, it may be determined if the operating context information was provided. For example, non-volatile storage device 210 may determine if the operating context information was provided to IHS 110. In one or more embodiments, determining if the operating context information was provided to IHS 110 may include retrieving information from a non-volatile memory medium of non-volatile storage device 210. For example, non-volatile storage device 210 may determine a value of a stored flag in determining if the operating context information was provided to IHS 110. For instance, the stored flag may indicate whether or not the operating context information was provided to IHS 110.

If the operating context information was provided, a query for the operating context information may be provided, at 550. For example, non-volatile storage device 210 may provide a query for the operating context information to IHS 110. At 555, the operating context information may be received. For example, non-volatile storage device 210 may receive operating context information 240 from IHS 110. For instance, operating context information 240 may include a FTL table, and non-volatile storage device 210 may receive the FTL table from IHS 110. At 565, the operating context information may be restored. For example, non-volatile storage device 210 may restore operating context information 240.

If the operating context information was not provided, the operating context information may be retrieved. For example, the operating context information may be retrieved from a non-volatile memory medium. For instance, non-volatile storage device 210 may retrieve operating context information 240 from non-volatile memory medium 250. In one or more embodiments, the method may proceed to 565.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    a processor;
    a first memory medium, communicatively coupled to the processor, that includes instructions executable by the processor to cause the information handling system to:
        provide a notification to a non-volatile storage device that indicates a pending power down of the non-volatile storage device without a power down of the information handling system;
        receive, in response to providing the notification to the non-volatile storage device, operating context information from the non-volatile storage device, wherein the operating context information includes a flash translation layer (FTL) table; and
        store the operating context information received from the non-volatile storage device via a second memory medium.

2. The information handling system of claim 1, wherein the non-volatile storage device includes a solid state drive (SSD).

3. The information handling system of claim 1, wherein the first memory medium further includes instructions executable by the processor to cause the information handling system to further provide the operating context information to the non-volatile storage device after storing the operating context information via the second memory medium.

4. The information handling system of claim 1, wherein the second memory medium is a volatile memory medium.

5. The information handling system of claim 1, wherein the second memory medium is the first memory medium.

6. The information handling system of claim 1, further comprising:
    the non-volatile storage device.

7. A method, comprising:
    providing a notification to a non-volatile storage device that indicates a pending power down of the non-volatile storage device without a power down of an information handling system;
    receiving, in response to providing the notification to the non-volatile storage device, operating context information from the non-volatile storage device, wherein the operating context information includes a flash translation layer (FTL) table;
    storing the operating context information received from the non-volatile storage device via a memory medium.

8. The method of claim 7, wherein the non-volatile storage device includes a solid state drive (SSD).

9. The method of claim 7, further comprising:
    providing the operating context information to the non-volatile storage device after the storing the operating context information via the memory medium.

10. The method of claim 7, wherein the memory medium is a volatile memory medium.

11. The method of claim 7, wherein the storing the operating context information via the memory medium includes storing the operating context information via a host memory buffer allocated for the non-volatile storage device and stored by the memory medium.

12. The method of claim 7, wherein the information handling system includes the non-volatile storage device.

13. A non-volatile storage device, configured to:
    receive a notification from an information handling system that indicates a pending power down of the non-volatile storage device without a power down of the information handling system;
    provide, in response to receiving the notification, operating context information of the non-volatile storage device to the information handling system, wherein the operating context information includes a flash translation layer (FTL) table;
    in response to providing the operating context information to the information handling system, set a flag that indicates that the information handling system stores the operating context information of the non-volatile storage device; and
    power down the non-volatile storage device.

14. The non-volatile storage device of claim 13, wherein the non-volatile storage device includes a solid state drive (SSD).

15. The non-volatile storage device of claim 13, further configured to:
    receive the operating context information of the non-volatile storage device from the information handling system.

16. The non-volatile storage device of claim 15, further configured to:
    determine, based at least on the flag, that the information handling system stores the operating context information of the non-volatile.

17. The non-volatile storage device of claim 15, further configured to:

store the operating context information of the non-volatile storage device via a volatile memory medium of the non-volatile storage device.

\* \* \* \* \*